Patented Nov. 12, 1940

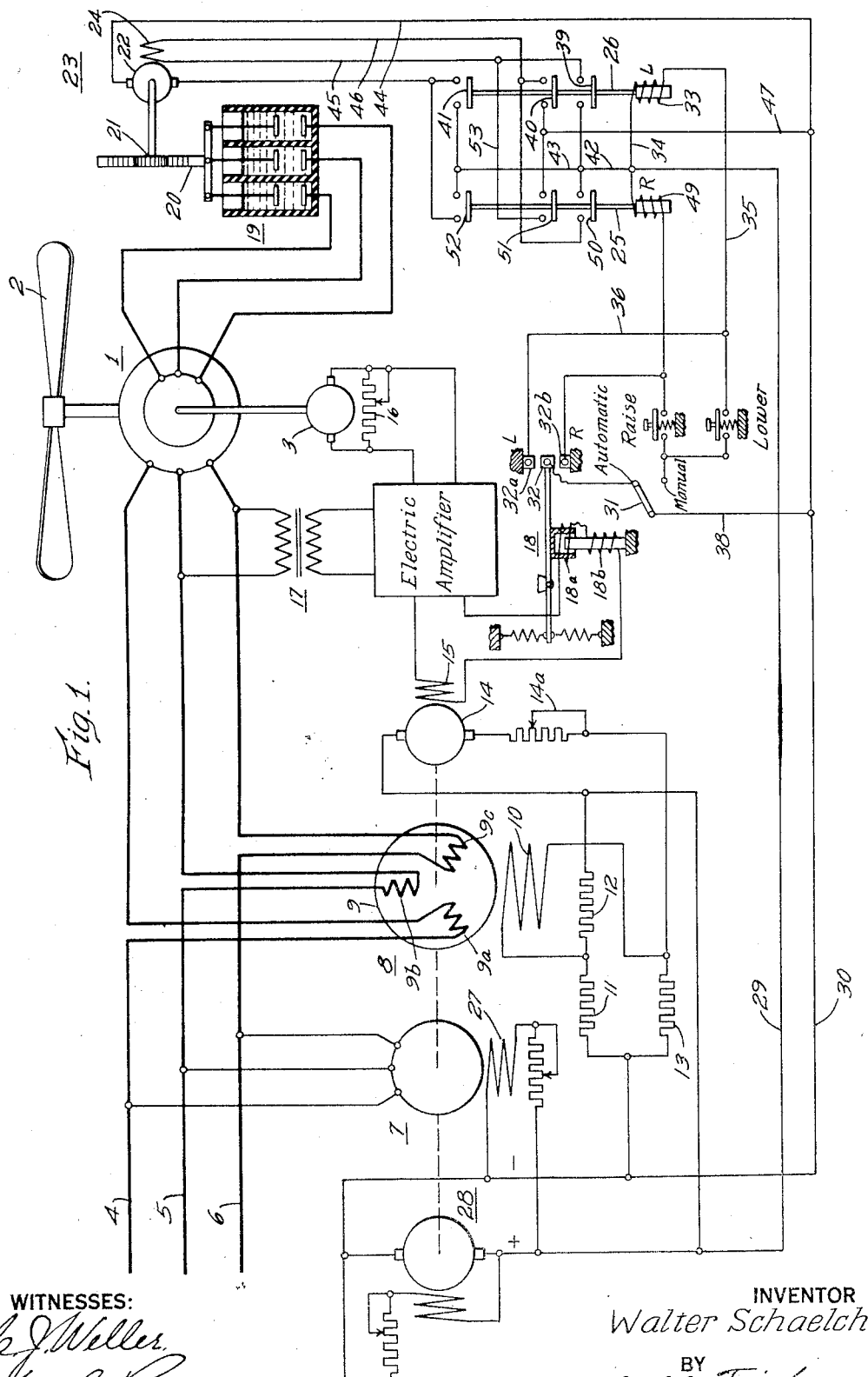

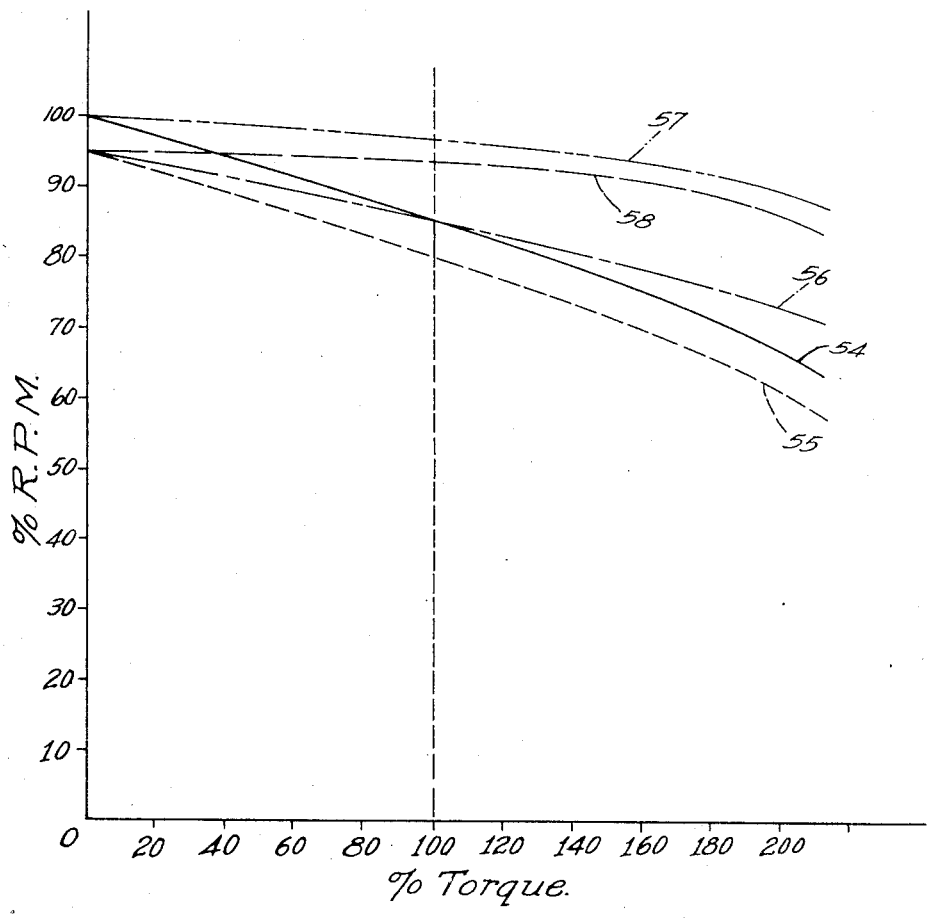

2,221,612

UNITED STATES PATENT OFFICE 2,221,612

SPEED REGULATOR

Walter Schachlin, Wilkinsburg, Pa., assignor to Westinghouse Electric & Manufacturing Company, East Pittsburgh, Pa., a corporation of Pennsylvania Application June 23, 1939, Serial No. 280,679

12 Claims. (Cl. 172—274)

My invention relates to a speed control system which is particularly applicable for controlling the speed of an induction motor. More specifically, it is directed to the use of a synchronous booster set in conjunction with a speed regulator, the purpose of which system is to maintain an induction motor and a propeller driven thereby, at a preselected speed value irrespective of fluctuations in voltage or in frequency of the alternating-current supply line. The above described drive is particularly useful for a wind tunnel drive, wherein the speed of the propeller must be maintained fairly constant to avoid turbulence in the air.

Heretofore, the most common way of maintaining a constant voltage at the terminals of the supply line was by the use of an induction type voltage regulator. However, such regulator is too slow to permit accurate speed control, and, causes hunting.

An object of my invention is to provide a speed regulator for an induction motor which is accurate but rapid in action and substantially devoid of hunting.

Another object of my invention is to provide a speed regulator for an induction motor, or the like, which is effective to compensate for speed variations due not only to the fluctuations in voltage in the alternating-current supply source, but due to variations in frequency of the supply source as well.

Other objects and advantages will become more apparent from a study of the following specification when considered in conjunction with the accompanying drawings, in which:

Figure 1 is a schematic showing of a control system embodying the principles of my invention; and Fig. 2 shows speed torque curves for an induction motor illustrating different characteristics for different values of resistance in the circuit including the rotor winding of the induction motor.

Referring more particularly to Figure 1, numeral 1 denotes an induction motor having mechanically coupled thereto a propeller 2 and a direct-current pilot generator 3. The stator winding of the induction motor is energized from an alternating-current source of supply which is fed through conductors 4, 5, and 6. Also energized by the alternating-current source of supply is a synchronous motor 7, the rotor of which is mechanically coupled to the rotor 9 of an alternating-current booster generator 8.

One of the windings 9a—9b—9c or 10, of the booster generator 8, presumably the rotor windings 9a—9b—9c as shown in the drawings, is connected to the alternating-current supply conductors, that is, the windings of each phase are connected in series with one of the supply conductors. The other of the windings, that is, the stator winding 10 of the booster generator 8 forms the neutral circuit of an electrical bridge circuit which bridge circuit comprises three resistor arms, 11, 12, and 13, and a fourth arm which includes the armature 14 of a variable voltage pilot exciter and a variable resistor 14a.

The field winding 15 of the pilot exciter is variably excited by pilot generator 3 in accordance with the speed of the induction motor 1 in the following manner. The voltage output across pilot generator 3 varies in direct proportion to the speed of induction motor 1 and this voltage is applied across the terminals of a potentiometer 16 and thence to the input terminals of a grid controlled electronic amplifier of any conventional type. The electronic amplifier is fed by transformer 17 which in turn is energized by one of the phases of the alternating current supply line, that is, across conductors 5 and 6. The output terminals of the electronic amplifier are connected in series with the field winding 15 of the pilot exciter and current relay coils 18a and 18b.

As is well known, the grid of the electronic amplifier is biased by a certain voltage, and when the voltage across the input terminals reaches a predetermined value, it will cause one or more thermionic tubes to conduct current. The conventional electronic amplifier contemplated is of the type which produces a current in the output circuit when the voltage across the input circuit is too low, that is, below a predetermined value, which output current progressively decreases in value as the voltage input increases. By adjusting the value of potentiometer 16, the speed at which the induction motor 1 is to be maintained may be controlled. In other words, the critical grid potential in the input circuit of the electronic amplifier may be furnished by any fraction of the terminal voltage of pilot generator 3 by merely adjusting the value of potentiometer 16.

Connected across the rotor winding of induction motor 1 is a liquid rheostat 19 which is mainly for the purpose of providing for a wide range of speed control for the induction motor 1, for example, from approximately 30% to 100% of its rated speed. The upper electrodes of the liquid rheostat are connected to a rack 20 which is driven by pinion 21 which in turn is coupled to the armature 22 of a pilot motor 23. The field winding 24 of pilot motor 23 is connected to relays 25 and 26 which effect raising and lowering, respectively, of rack 20 and the upper electrodes of the rheostat 19, as will appear more fully hereinafter.

A direct-current source of supply is provided to energize the field winding 27 of synchronous motor 7 and to energize the field or stator winding 10 of booster generator 8 through the electrical bridge circuit (11 to 14, inclusive, and 14a). This direct-current source of supply indicated by + and — may be a battery or any other source of direct-current, but a preferable manner of providing this direct-current source is by coupling the armature of an exciter 28 to the synchronous motor shaft so that in effect exciter 28 acts not only to excite field windings 27 and 10, but acts as a direct-current source of supply for the control equipment energized through conductors 29 and 30.

Inasmuch as the rotor of synchronous motor 7 and the alternating-current booster 8 are mechanically coupled, it will be apparent that the currents induced in the rotor windings of the booster generator 8 will be in phase with the alternating-current supply voltage. Hence, if the voltage induced in the windings 9a, 9b and 9c, connected in series with the supply conductors 4, 5 and 6 is in one direction, it will add to or boost the main supply voltage, whereas, if the induced voltage is in an opposite direction, it will oppose or buck the main supply voltage.

The resistance values of the bridge circuit arms are so selected that a variation in voltage across the armature 14 of the pilot exciter from zero to a maximum value will cause a change of booster voltage from a positive maximum to a negative maximum. In other words, at some intermediate value of voltage of the pilot exciter, say for example, 50% voltage, the electrical bridge circuit will be balanced, hence, no current will flow through the neutral leg which includes winding 10 of the booster generator. Hence, no voltage will be induced in the windings connected to the conductors 4, 5 and 6. Accordingly, there will be no correction of the voltage of the alternating-current source of supply. By maintaining the booster voltage at zero value for a balanced condition in the bridge circuit, the booster voltage is available at all times for instantaneous correction in either direction of the alternating-current supply voltage. A liquid rheostat 19 is arranged so as to slowly follow the booster voltage when the latter exceeds a certain value. This function is accomplished by means of current relay 18 which measures the field current of winding 15 of the pilot exciter.

Assuming the conductors 4, 5 and 6 have been energized, then the motor 1 is set in operation. At start all the slip-regulator resistance will be in the secondary circuit and the motor 1 will thus operate at a high slip and high torque.

The pilot generator will be operated by the motor 1 and its output will be small in view of its low speed.

The synchronous motor 7 will be operating at synchronous speed, the exciter 28 will produce normal voltage on buses, or conductors 29 and 30, and the booster generator 8 and the variable voltage pilot exciter will operate at full speed.

Potentiometer 16 is set at a value corresponding to the speed at which it is desired to run induction motor 1 and propeller 2. Since, as heretofore pointed out, the slip of motor 1 is high, its speed is lower than that selected by potentiometer 16, hence, the voltage input of the electronic amplifier during this period is low. Therefore, the output current for the conventional electronic amplifier selected will be higher than its normal value. The effect of this high output current is two-fold: first, it will increase the current in field winding 15 of the pilot exciter 14 causing an unbalance in the electrical bridge and causing current flow through winding 10 in such a direction to cause the booster generator to boost the voltage of the alternating-current source of supply.

This boost in voltage will cause a small increase in speed of the induction motor 1. The rating of the booster generator 8 is small as compared to that of induction motor 1, and is intended to boost the voltage only up to 10%, for example, of the line voltage variation. Hence, it may in effect be considered as a vernier adjusting means of the speed of the induction motor and propeller. The main speed control adjustment is made by varying the resistance of the liquid rheostat 19 which is accomplished in the following manner.

Since, as it has been seen, a higher than normal current flows through the output circuit including current relay coils 18a and 18b, as the result of abnormally low speed of induction motor 1, the current through the relay coils 18a and 18b will be sufficiently high so as to move the armature thereof counterclockwise to close contact members 32 and 32a. This will complete a circuit through coil 33 of relay 26 which circuit may be traced from the positive conductor 29, through conductor 34, coil 33, conductors 35 and 36, the bridged contact members 32 and 32a, bridged contact members of switch 31 and conductor 38 to the negative conductor 30. The completion of the circuit through coil 33 effects the closing of contact members 39, 40 and 41, thus completing a circuit through pilot motor 23. The circuit for the pilot motor may be traced from the positive conductor 29, through conductor 42, thence through two parallel circuits, one of which goes through conductor 43, bridged contact members 41, armature 22 and conductor 44, and the other of which goes through bridged contact members 39, conductor 45, field winding 24, conductor 46, bridged contact members 40, and conductor 47, thence, both parallel paths join the negative conductor 30. In other words, the current flows through field coil 24 in such a direction as to cause the pilot motor 23 to move rack 20 downwardly, thereby decreasing the resistance of the liquid rheostat 19 and effecting an increase in speed of the induction motor 1, and thus the propeller 2. This increase in speed of induction motor 1 continues until the preselected speed, as adjusted by the potentiometer 16, is attained, at which time the voltage input is sufficiently high so as to cause substantial decrease in the output current sufficient to maintain the armature of relay 18 in a floating condition, that is, out of contact with both contact members 32a and 32b. By virtue of the opening of the circuit for coil 33 the pilot motor 23 is stopped, hence, the motor will discontinue its lowering movement of the electrodes of liquid rheostat 19. At the same time, the current through field winding 15 has dropped sufficiently so as to maintain the booster generator voltage at substantially zero.

Assume now that the voltage of the alternating-current source of supply, that is, across conductors 4, 5 and 6, has for some reason increased above its normal value. This will effect increased speed of induction motor 1 and thus increase the input in the electronic amplifier. The output is thus decreased and the voltage across the armature 13 of the variable voltage pilot exciter is decreased which in turn effects current flow through field winding 10 in an opposite direction from that heretofore described. The booster generator 8 thus produces a bucking voltage which reduces the line voltage to a certain extent.

At the same time, the decreased current in relay coils 18a and 18b will permit closing of contact members 32 and 32b, thus completing a circuit from the direct-current source 28, through coil 49, thus causing upward movement of the armature of relay 25 to close contact members 50, 51, and 52. A circuit will thus be completed from the direct-current source through pilot motor 23, but in a reverse direction through its field winding 24 which circuit may be traced from the positive conductor 29 through conductor 42, thence branching into two parallel circuits, one going through conductor 43, bridged contact members 52, armature 22, and conductor 44, and the other parallel circuit going through bridged contact members 50, conductor 46, field winding 24, conductor 45, conductor 53, bridged contact members 51 and conductor 47, thence, the two parallel branches join negative conductor 30. This energization of field coil 24 in an opposite sense effects raising of the electrodes of liquid rheostat 19, hence the speed of induction motor 1 is decreased. This decrease in speed continues until a condition of balance has been again attained, and until the bridging contact member 32 of the current relay 18 again floats between contact members 32a and 32b.

If it is desired to manually effect movement of the upper electrodes of liquid rheostat 19, switch 31 is thrown to the "manual" position and the desired operation may be obtained by the "raise" or "lower" pushbuttons.

Variation in speed of the induction motor 1 is caused not only by variation in the voltage of the supply line but is caused by frequency variation in the supply line. The above described control circuit is effective to correct for speed variations due to frequency variation of the supply within predetermined limits. In order that a maximum amount of correction due to change in frequency of the supply line may be made, there should be at least a certain amount of resistance in liquid rheostat 19, that is, in the rotor circuit. The reason for this will be more apparent when analyzing the speed-torque curves of induction motor 1, as represented by Figure 2.

Assume that curve 54 represents the normal speed-torque curve of the induction motor 1 in a case where there is a fair amount of resistance in liquid rheostat 19, that is, across the rotor. Let us assume that the frequency of the supply line decreases to such an extent as to tend to have a characteristic such as shown by curve 55. In order to correct for this decrease in speed, the booster generator and the liquid rheostat will effect a boost in the line voltage and increase the speed of the motor 1, thus resulting in a characteristic such as shown by curve 56 which curve shows that for 100% torque the speed will have been corrected to its previous amount.

Let us assume that now that liquid rheostat 19 has very little resistance, the speed-torque characteristic of the induction motor in this situation will be flatter and substantially as represented by curve 57. Assume now that the frequency decreases to an extent tending to result in a characteristic as represented by curve 58. It is now desired to flatten or raise curve 58 so as to provide the same speed for 100% torque as provided by curve 57. However, this is impossible because 58 has already such a flat characteristic that even a no resistance value of liquid rheostat 19 together with a maximum boosting voltage of the booster generator will not accomplish raising of curve 58 sufficiently so as to obtain the same speed for 100% torque as curve 57. In other words, the maximum correction obtainable would result in a substantially horizontal curve, but even this is insufficient to provide the necessary correction. For this reason, therefore, there must always be a definite amount of resistance in the rotor circuit, particularly for large variations in frequency of the supply line. Of course, if the frequency variations are small, the curves need not have a large amount of drooping.

In accordance with my speed control system, it is possible to maintain motor speed within the $\pm \frac{1}{4}\%$, with line voltage variations of $\pm 5\%$ and frequency changes of $\pm \frac{1}{2}$ cycle. This accuracy can be maintained throughout the whole speed range at all slip frequencies of 5% or greater. It is understood, of course, these values are merely exemplary and not limiting as to the possibilities of the control system in accordance with my invention.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. A speed control system including, in combination, an induction motor, an alternating-current supply line, a synchronous booster generator which is in phase with the current in said supply line, comprising rotor and stator windings, one of which windings is connected to the said supply line, means responsive to the speed of said induction motor, and including an excitation source, for varying the magnitude of excitation current flow through the other of said windings for effecting bucking or boosting of the voltage of said alternating-current supply line by said booster generator, thereby maintaining a substantially constant voltage in said alternating-current supply line and substantially constant speed of said induction motor.

2. A speed control system including, in combination, an induction motor, an alternating-current supply line, a synchronous booster generator comprising rotor and stator windings, said stator windings being connected in series with said supply line, means responsive to the speed of said induction motor, and including an excitation source, for varying the magnitude of exciting current through said rotor windings of said booster generator in a range extending from a negative value to a positive value thereby effecting bucking or boosting of the voltage of said alternating-current supply line by said booster generator, thereby maintaining a substantially constant voltage in said alternating-current supply line and a substantially constant speed of said induction motor.

3. A speed control system including, in combination, an induction motor, an alternating-current supply line, a synchronous booster generator comprising rotor and stator windings, said stator windings being connected in series with said supply line, means responsive to the speed of said induction motor including an electrical bridge circuit having three resistance arms, a fourth arm which includes means responsive to variations in speed of said induction motor and a neutral arm which includes said rotor windings for varying the excitation of said booster generator in a range extending from a negative value to a positive value thereby effecting bucking or boosting of the voltage of said alternating-current supply line by said booster generator, thereby maintaining a substantially constant voltage in said alternating current supply line and a substantially constant speed of said induction motor.

4. A speed control system including, in combination, an induction motor, an alternating-current supply line, a synchronous booster generator comprising rotor and stator windings, said stator windings being connected in series with said supply line, means responsive to the speed of said induction motor, including an electrical bridge circuit having three resistance arms, a fourth arm which includes a pilot exciter whose voltage varies in accordance with the speed of said induction motor and a neutral arm which includes said rotor windings for varying the excitation of said booster generator in a range extending from a negative value to a positive value thereby effecting bucking or boosting of the voltage of said alternating-current supply line by said booster generator, thereby maintaining a substantially constant voltage in said alternating-current supply line and a substantially constant speed of said induction motor.

5. A speed control system including, in combination, an induction motor, a three phase alternating-current supply line, a synchronous motor which is energized by said supply line, an alternating-current generator which is mechanically coupled to said synchronous motor and comprising stator and rotor windings, one of which windings is connected to the said supply line, means responsive to the speed of said induction motor, and including an excitation source, for varying current flow through the other of said windings for effecting bucking or boosting of the voltage of said alternating-current supply line by said booster generator, thereby maintaining a substantially constant voltage in said alternating-current supply line and substantially constant speed of said induction motor.

6. A speed control system including, in combination, an induction motor, a three phase alternating-current supply line, a synchronous motor which is energized by said supply line, an alternating-current generator which is mechanically coupled to said synchronous motor and comprising stator and rotor windings said stator windings being connected in series with said supply line, means responsive to the speed of said induction motor, and including an excitation source, for varying the excitation current flow through the rotor windings of said booster generator in a range extending from a negative value to a positive value thereby effecting bucking or boosting of the voltage of said alternating-current supply line by said booster generator, thereby maintaining a substantially constant voltage in said alternating-current supply line and a substantially constant speed of said induction motor.

7. A speed control system including, in combination, an induction motor, a three phase alternating-current supply line, a synchronous motor which is energized by said supply line, an alternating-current generator which is mechanically coupled to said synchronous motor and comprising stator and rotor windings, one of which windings is connected to the said supply line, means responsive to the speed of said induction motor for controlling the excitation of the other of said windings for effecting bucking or boosting of the voltage of said alternating-current supply line by said booster generator, thereby maintaining a substantially constant voltage in said alternating-current supply line and substantially constant speed of said induction motor, including an electrical bridge circuit having three resistance arms, a fourth arm which includes a pilot exciter whose voltage varies in accordance with the speed of said induction motor and a neutral arm which includes said rotor windings.

8. A speed control system including, in combination, an induction motor, an alternating-current supply line, a synchronous booster generator which is in phase with the current in said supply line, comprising rotor and stator windings, one of which windings is connected to the said supply line, means responsive to the speed of said induction motor for controlling the excitation of the other of said windings for effecting bucking or boosting of the voltage of said alternating-current supply line by said booster generator, thereby maintaining a substantially constant voltage in said alternating-current supply line and substantially constant speed of said induction motor, said induction motor having a variable resistor connected across its rotor winding; and means also responsive to the speed of said induction motor for effecting variation in resistance of said variable resistor to compensate for variations in speed of said induction motor from a predetermined value.

9. A speed control system including, in combination, an induction motor, an alternating-current supply line, a synchronous booster generator comprising rotor and stator windings, said stator windings being connected in series with said supply line, means responsive to the speed of said induction motor for varying the excitation of said booster generator in a range extending from a negative value to a positive value thereby effecting bucking or boosting of the voltage of said alternating-current supply line by said booster generator, thereby maintaining a substantially constant voltage in said alternating-current supply line and a substantially constant speed of said induction motor, said induction motor having a variable resistor connected across its rotor winding; and means also responsive to the speed of said induction motor for effecting variation in resistance of said variable resistor to compensate for variations in speed of said induction motor from a predetermined value.

10. A speed control system including, in combination, an induction motor, an alternating-current supply line, a synchronous booster generator comprising rotor and stator windings, said stator windings being connected in series with said supply line, means responsive to the speed of said induction motor, including an electrical bridge circuit having three resistance arms, a fourth arm which includes a pilot exciter whose voltage varies in accordance with the speed of said induction motor and a neutral arm which includes said rotor windings for varying the excitation of said booster generator in a range extending from a negative value to a positive value thereby effecting bucking or boosting of the voltage of said alternating-current supply line by said booster generator, thereby maintaining a substantially constant voltage in said alternating-current supply line and a substantially constant speed of said induction motor, said induction motor having a variable resistor connected across its rotor winding; and means also responsive to the speed of said induction motor for effecting variation in resistance of said variable resistor to compensate for variations in speed of said induction motor from a predetermined value.

11. A speed control system including, in combination, an induction motor, an alternating-current supply line, a synchronous booster generator comprising rotor and stator windings, said stator windings being connected in series with said supply line, means responsive to the speed of said induction motor, including an electrical bridge circuit having three resistance arms, a fourth arm which includes a pilot exciter whose voltage varies in accordance with the speed of said induction motor and a neutral arm which includes said rotor windings for varying the excitation of said booster generator in a range extending from a negative value to a positive value thereby effecting bucking or boosting of the voltage of said alternating-current supply line by said booster generator, thereby maintaining a substantially constant voltage in said alternating-current supply line and a substantially constant speed of said induction motor, said induction motor having a liquid rheostat connected across its rotor winding and a reversible pilot motor for moving the electrodes of said liquid rheostat either towards or away from each other; and electronic means also responsive to the speed of said induction motor for effecting operation of said reversible pilot motor in one direction or another depending upon the deviation of the speed of said induction motor from a preselected value.

12. A speed control system including, in combination, an induction motor, an alternating-current supply line, a synchronous booster generator which is in phase with the current in said supply line, comprising rotor and stator windings, one of which windings is connected to the said supply line, means responsive to the speed of said induction motor for controlling the excitation of the other of said windings for effecting bucking or boosting of the voltage of said alternating-current supply line by said booster generator, thereby maintaining a substantially constant voltage in said alternating-current supply line and substantially constant speed of said induction motor, said induction motor having a variable resistor connected across its rotor winding; and means also responsive to the speed of said induction motor for effecting variation in resistance of said variable resistor to compensate for variations in speed of said induction motor from a predetermined value, the resistance of said variable resistor being always at a sufficient value so as to correct for speed variations of said induction motor due to changes in frequency of the alternating-current supply line.

WALTER SCHAELCHLIN.